United States Patent
Schenck et al.

(10) Patent No.: US 10,880,804 B2
(45) Date of Patent: Dec. 29, 2020

(54) MOBILE DEVICE DISPLAY OF FEDERATED WIRELESS ACCESS POINT NETWORKS FOR 5G OR OTHER NEXT GENERATION NETWORK

(71) Applicant: AT&T Intellectual Property I, L.P., Atlanta, GA (US)

(72) Inventors: Natalia Schenck, Dallas, TX (US); Sheldon Meredith, Roswell, GA (US); William Cottrill, Canton, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 56 days.

(21) Appl. No.: 16/209,148

(22) Filed: Dec. 4, 2018

(65) Prior Publication Data
US 2020/0178142 A1    Jun. 4, 2020

(51) Int. Cl.
| | | |
|---|---|---|
| H04W 4/00 | (2018.01) | |
| H04W 36/30 | (2009.01) | |
| H04W 36/14 | (2009.01) | |
| H04W 64/00 | (2009.01) | |
| H04B 17/318 | (2015.01) | |
| H04W 88/06 | (2009.01) | |
| H04W 84/12 | (2009.01) | |

(52) U.S. Cl.
CPC .......... *H04W 36/30* (2013.01); *H04B 17/318* (2015.01); *H04W 36/14* (2013.01); *H04W 64/003* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | |
|---|---|---|
| 5,950,130 A | 9/1999 | Coursey |
| 6,594,484 B1 | 7/2003 | Hitchings |
| 6,990,649 B2 | 1/2006 | Claras |
| | (Continued) | |

FOREIGN PATENT DOCUMENTS

| | | |
|---|---|---|
| CN | 100442890 C | 12/2008 |
| FR | 2810837 A1 | 6/2003 |
| | (Continued) | |

OTHER PUBLICATIONS

Griffel, Frank M., et al. "Electronic Contract Negotiation as an Application Niche for Mobile Agents1." Proc. EDOC—International IEEE Workshop on Enterprise Distributed Object Computing, Surfer's Paradise, Oct. 1997. 13 pages.

(Continued)

*Primary Examiner* — Bob A Phunkulh
(74) *Attorney, Agent, or Firm* — Amin, Turocy & Watson, LLP

(57) ABSTRACT

Wireless fidelity (Wi-Fi) devices that are not associated with a specific wireless carrier can be contractually operated as an extension of the specific Wi-Fi carrier. In this case, a display screen of a mobile device, that is currently communicating with the Wi-Fi device as an extension of the carrier, can display the carrier info. The display can be a result of a comparison between an internal mobile device data store and/or an external list that comprises the Wi-Fi devices that are acting as extensions of the carrier for a 5G network.

20 Claims, 12 Drawing Sheets

(56) References Cited

U.S. PATENT DOCUMENTS

| | | |
|---|---|---|
| 7,292,852 B2 | 11/2007 | Uchida |
| 8,086,231 B2 | 12/2011 | Uchida |
| 8,326,262 B2 | 12/2012 | Duan et al. |
| 8,666,379 B2 | 3/2014 | Tanabe |
| 8,805,374 B2 | 8/2014 | Zhu et al. |
| 9,264,893 B2 | 2/2016 | Jung |
| 9,942,829 B2 | 4/2018 | Canpolat et al. |
| 2002/0102973 A1 | 8/2002 | Rosenberg |
| 2010/0223569 A1* | 9/2010 | Vuong .............. H04M 1/72552 715/772 |
| 2014/0211776 A1* | 7/2014 | Jang .................... H04W 48/16 370/338 |
| 2015/0031367 A1* | 1/2015 | Singh ................. H04L 43/0882 455/437 |
| 2015/0201088 A1 | 7/2015 | Wu et al. |
| 2015/0244722 A1 | 8/2015 | Sedlacek et al. |
| 2015/0365868 A1* | 12/2015 | Chang .................. H04W 36/22 370/230 |
| 2016/0135118 A1* | 5/2016 | Anikina ................ H04W 4/029 370/338 |
| 2017/0134261 A1 | 5/2017 | Seo et al. |
| 2018/0242148 A1* | 8/2018 | Cu .................... H04W 12/0608 |
| 2018/0270728 A1 | 9/2018 | Van Oost et al. |

FOREIGN PATENT DOCUMENTS

| | | |
|---|---|---|
| JP | 2000004481 A | 1/2000 |
| JP | 2002044729 A | 2/2002 |
| JP | 2012039532 A | 2/2012 |
| JP | 2015061289 A | 3/2015 |
| JP | 2016012824 A | 1/2016 |
| TW | 490950 B | 6/2002 |

OTHER PUBLICATIONS

Sanz Merino, Ana "Secure Authentication System for Public WLAN Roaming." University of California at Berkeley 2005. Mobile Networks and Applications 10.3 (2005). 77 pages.

Perez, Manuel Gil, et al. "Advanced Policies for the Administrative Delegation in Federated Environments." Dependability (Depend), 2010 Third International Conference, IEEE, 2010. 7 pages.

* cited by examiner

MOBILE DEVICE DISPLAY OF FEDERATED WIRELESS ACCESS POINT NETWORKS FOR 5G OR OTHER NEXT GENERATION NETWORK

TECHNICAL FIELD

This disclosure relates generally to facilitating a mobile device display. For example, this disclosure relates to facilitating a mobile device display for a federated wireless access point device for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating a mobile device display for a federated wireless access point device is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
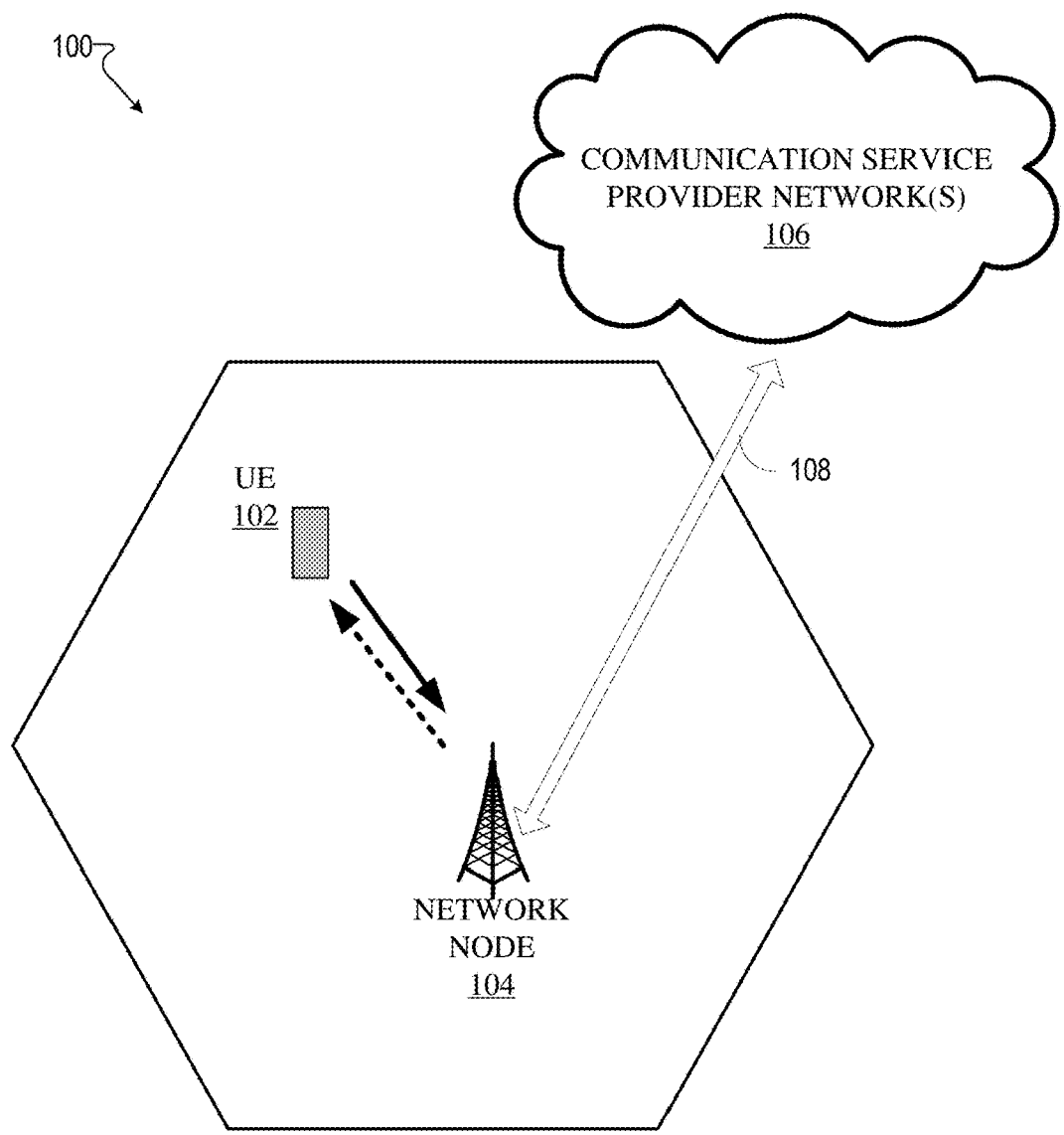
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a mobile device display for a federated wireless access point device for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a mobile device display for a federated wireless access point device for a 5G network. Facilitating a mobile device display for a federated wireless access point device for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A wireless carrier can compel a mobile device to display available wireless radio connections as belonging to a home network even when the connections are non-carrier radios that are federated with the network. For example, this scenario can occur through a contractual relationship between the carrier and the wireless access device owners. The home network is that of the wireless carrier to which the mobile device is subscribed. For instance, when a mobile device is roaming on Joe's Pizza Wi-Fi, the mobile device display generally displays data related to the Wi-Fi device (e.g., something like JPizza). However, when the same device roams on XYZ Mobile Services Wi-Fi, and assuming the home network has a federating contract with XYZ Mobile Services, the mobile device can display carrier info (e.g., something like AttMobile). Thus, the customer perception is that their device is still on AttMobile which is true in practicality, because there is a service agreement between XYZ Mobile services and AT&T Mobile.

Mobile device must eventually be able to dynamically switch between networks and carriers in a seamless manner. The problem that comes from this is the expectation from a mobile customer about being "on" their carrier's network. If they see on their mobile device that they are connected to XYZ Mobile, it can raise concerns. If Wi-Fi is forced into an "on" state, where the customer can no longer have the option to turn it off, then a customer may become frustrated that they are no longer on their carrier's network and instead they are on a Wi-Fi service that they feel they should not be on at all. This would generally be a fair concern, except in those cases where the non-carrier Wi-Fi provider has a contractual agreement with that provider including performance metrics. In such cases, it is arguable that the non-carrier network is a contracted extension of the carrier network and would therefore be fairly claimed to be part of the carrier network.

However, when the mobile device can be informed about which specific wireless access points (WAP) (including small-cell Wi-Fi access points) are part of the carrier's network (e.g., "white list" of WAPs). Each Wi-Fi network can be identified by a service set identifier (SSID) that is supposed to be unique to a particular area, however it may not be unique across the country or across the globe. Another unique identifier for a Wi-Fi access point can be a basic SSID (BSSID), which represents a media access control address of the WAP generated by combining a 24 bit organization unique identifier (OUI, the manufacturer's identity) and the manufacturer's assigned 24-bit identifier for a radio chipset in the WAP. Devices connected to a Wi-Fi network already have the capability of obtaining the BSSID from the WAP they are connected to.

When connecting to a Wi-Fi network, the mobile device can obtain the BSSID of the WAP to which it is connected and compare it to a "white list" of WAPs (as identified by BSSID) provided by carrier. This disclosure provides multiple means for providing this information to the mobile device. This information can be stored in a resident device memory or be queried from a remote information store. For instance, when the mobile device connects to a specific Wi-Fi media access control (MAC) address (BSSID), the software functionality on the mobile device can query either an internal file and/or a remote data store.

An internal file can comprise those Wi-Fi MACs statically associated with the geographic locale of the mobile device. Therefore, every MAC in the country need not be stored. However, those that are within a geographic threshold (e.g., relatively near the mobile device "home") can be stored to save storage space. The definition of home can change based on the amount of memory allocable to the task of storing the Wi-Fi MACs. Thus, if a user takes a vacation, perhaps the "home Wi-Fi set" is revised after a specific time period (e.g., 72 hours). However, if the user takes a business trip, the "home Wi-Fi set" can be revised after only 24 hours, the previous home Wi-Fi set can be deleted, and a new Wi-Fi set can be labeled. There can be a tradeoff between local memory size and/or cost and the delay for a remote query and the need for wireless usage to make such a remote query. This can be managed by configuration parameters on each mobile device type. Furthermore, the amount of memory allocated to the task of retaining the "home Wi-Fi set" can be fungible and can be reduced to a minimum or even zero if memory needs dictate it. Mobile devices can also download the list of "home area" BSSIDs after an "entitlement check" that queries which services are enabled for the particular device. The entitlement check function can vary by device. For example, Apple devices can perform an entitlement check upon power up, but Samsung devices can perform an entitlement check after each 24-48 hour period. The entitlement check can also be triggered by the network or by the device itself. When the mobile device completes a data connection to a Wi-Fi access point, the mobile device can either query the entitlement server for the list of "home area" MAC addresses or use a list that was downloaded into the resident memory after the last entitlement check.

In response to provisioning of the aforementioned information, the mobile device can then display, on its local display, the information prescribed by the wireless carrier in the provided information. Whether in memory, or a response to a query to a remote server, a prescribed response can be displayed on the display of the mobile device. For instance, a subscriber on their own AT&T network can see AT&T because the mobile network code is their own. If the device roams onto AT&T Wi-Fi, the device could also display AT&T if desired, since it is just an extension of the AT&T network. However, if the mobile device roams on XYZ Mobile, the mobile software functionality (recognizing it is not on its home MNC) can locally query the "home area list" or make a remote query, and if the response is "AT&T", then the mobile device can display "AT&T". It could show any data indicating that it is a partner of AT&T. If there is no local or remote response for the Wi-Fi MAC, then the mobile device can simply display the SSID of the Wi-Fi access point, such as JPizza, which is what currently transpires.

Similar to how the cellular communication mode is displayed (specifying the type of data communication mode being used {e.g., LTE, UMTS, GPRS, etc.}), the mobile device can still display Wi-Fi as the standard being used for data communication when connected to a Wi-Fi network. In the scenario of querying a remote information store (e.g., the entitlement check), the entitlement server can also indicate how to display information. For example, the AT&T name with the Wi-Fi icon can be displayed for the MAC addresses that are associated with AT&T hotspots and AT&T roaming partners' hotspots that have service level agreements (SLAs) (i.e. the "white list" of MAC addresses), and display "unknown" or a similar indicator for all others.

Some mobile devices can come preconfigured to auto-connect to carrier hotspots (e.g., ATTWiFi) or H52.0. In these scenarios, the mobile device can display either the carrier name for carrier hotspots, or the HS2.0 indicator. Modification of these hard-coded display characters can occur when the mobile device recognizes it is not using a connection requiring hard-coded characters, leaving open the possibility of something other than the SSID to display. The ultimate determinant is either the local file or the response from the remote server upon query.

In one embodiment, described herein is a method comprising receiving, by a mobile device of a wireless network and comprising a processor, first wireless network device data representative of a first wireless network device determined to be associated with the wireless network. In response to connecting to the first wireless network device, the method can comprise receiving, by the mobile device, second wireless network device data from the first wireless network device. The method can also comprise comparing, by the mobile device, the first wireless network device data to the second wireless network device data. Based on a result of the comparing, the method can comprise displaying, by the mobile device, a Wi-Fi indicator on a screen of the mobile device, and the method can comprise connecting, by the mobile device, to a second wireless network device different from the first wireless network device. Additionally, in response to the connecting, the method can comprise determining, by the mobile device, whether a condition associated with the connecting has been satisfied.

According to another embodiment, a system can facilitate, generating first wireless network device data associated with a wireless network device of a wireless network based on a condition being determined to have been satisfied. The system can facilitate sending the first wireless network device data to a mobile device of the wireless network. In response to the mobile device communicating with the wireless network device, the system can facilitate comparing the first wireless network device data to second wireless network device data. Furthermore, based on the facilitating the comparing, the system can comprise facilitating displaying service provider data indicative of an identity of a service provider associated with the wireless network via a screen of the mobile device.

According to yet another embodiment, described herein is a machine-readable storage medium that can perform the operations comprising receiving first wireless network device data representative of a first wireless network device being determined to be associated with a wireless network. In response to communicating with the first wireless network device, the machine-readable storage medium can perform operations comprising receiving second wireless network device data from the first wireless network device. The machine-readable storage medium can perform operations comprising comparing the first wireless network device data to the second wireless network device data, resulting in first comparison data. Based on the first comparison data, the machine-readable storage medium can perform operations comprising displaying connection data via a visual interface of a mobile device of the wireless network. Additionally, in response to communicating with a second wireless network device and based on a second comparison of the first wireless network device data to third wireless network device data from the second wireless network device, the machine-readable storage medium can perform operations comprising removing the connection data.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
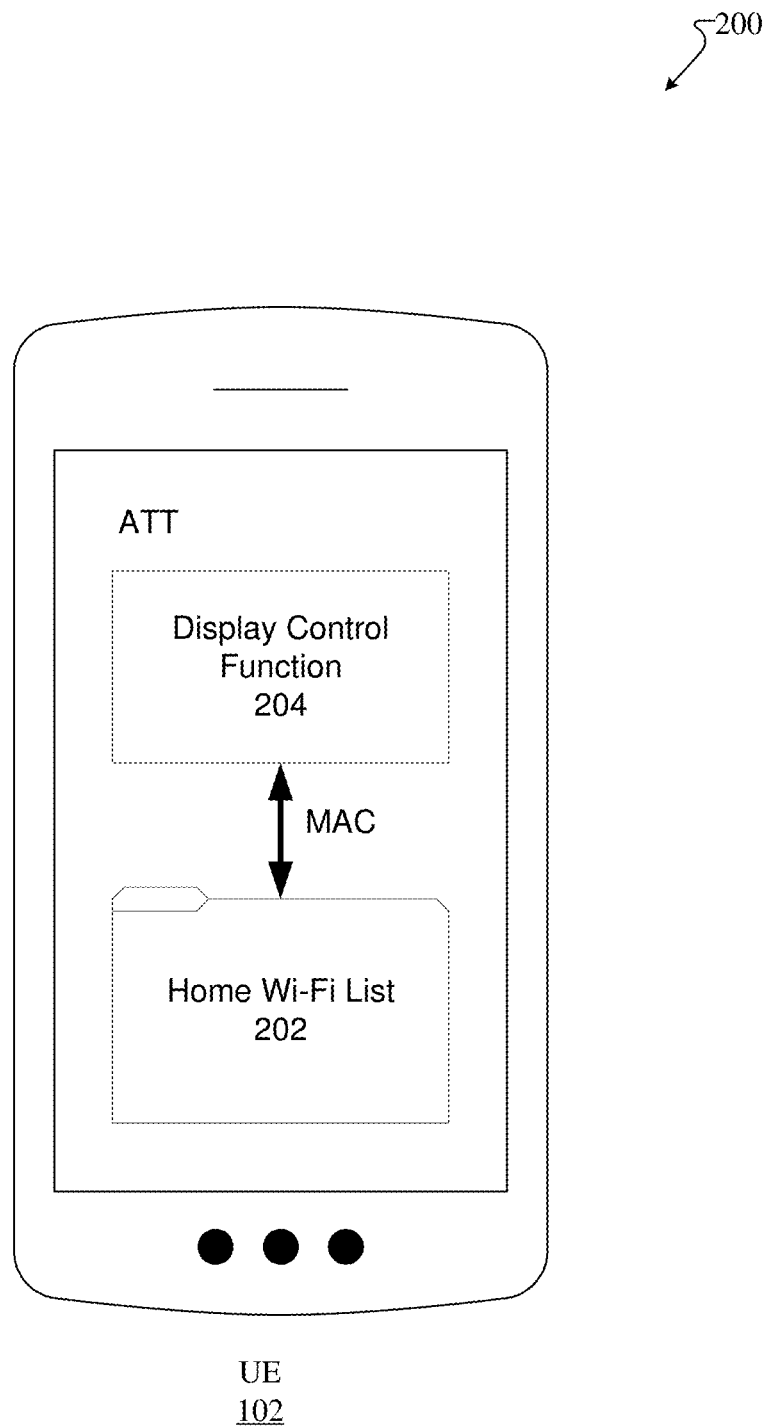
FIG. 2 illustrates an example schematic system block diagram of a display screen of a mobile device.
Figure 3:
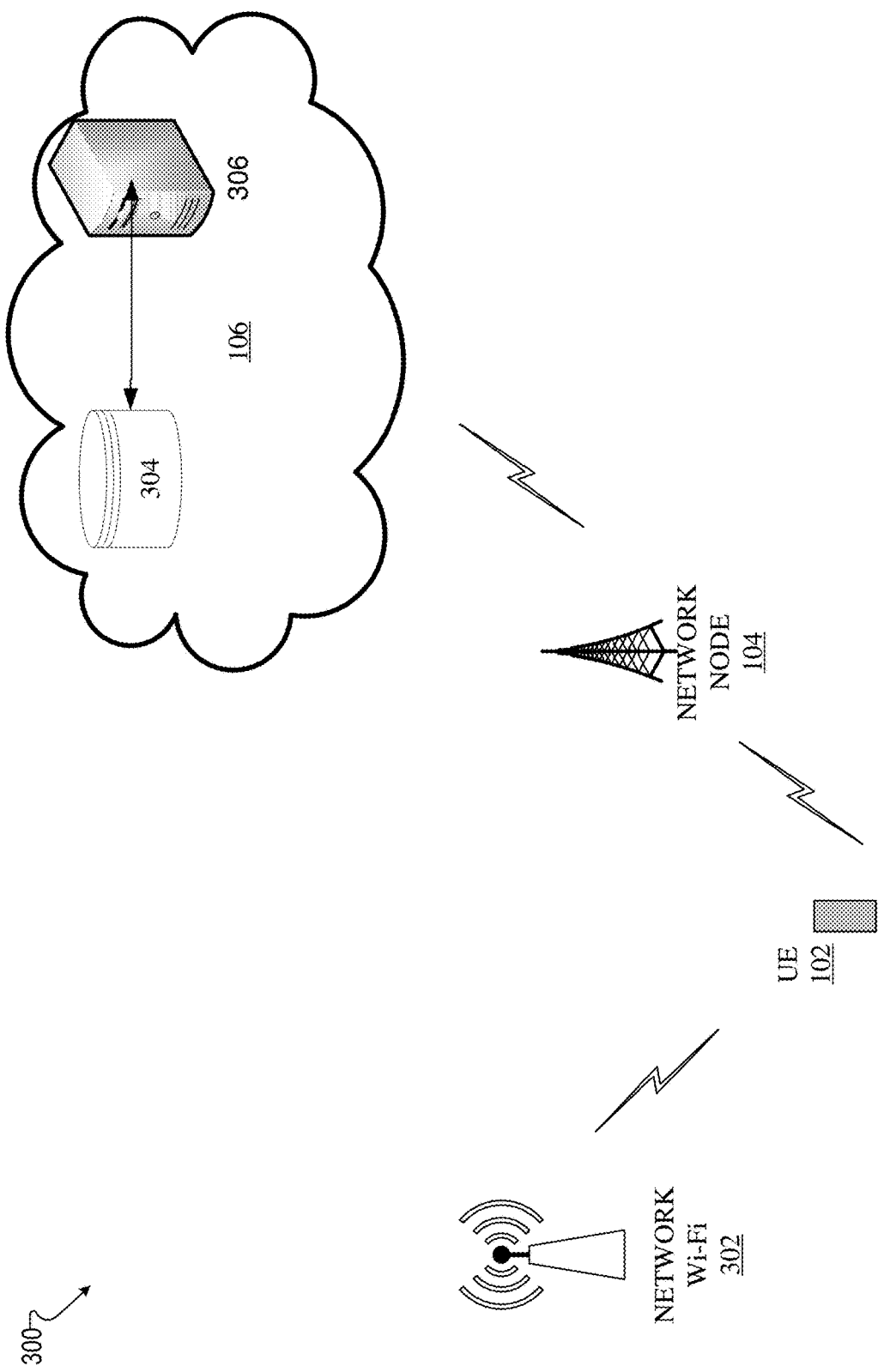
FIG. 3 illustrates an example schematic system block diagram of a mobile device communicating with a carrier-based wireless access point device.

Referring now to FIG. 2, illustrated is an example schematic system 200 block diagram of a display screen of a mobile device. In response to provisioning information from the system 100, the UE 102 can display data associated with the wireless carrier that hosts the UE 102 communication. The data can be hosted in memory of the UE 102, or the data can be queried from a remote server as shown in FIG. 3. Based on the data, the display of the UE 102 can be updated. For example, a UE 102 on an AT&T carrier network can see "AT&T" because the mobile network code is its own. If the UE 102 roams onto an AT&T Wi-Fi, the UE 102 can still display "AT&T", since the AT&T Wi-Fi is an extension of the AT&T network. However, if the mobile device roams onto another mobile carrier (e.g., XYZ Mobile), then the UE 102 can locally query the home Wi-Fi list 202 or make a remote query. If the response to the query is "AT&T", then the UE 102 can display, via the display control function 204, "AT&T" and/or an associated AT&T icon. However, if there is no local or remote response for the Wi-Fi MAC, then the mobile device can display the SSID of the Wi-Fi access point (e.g., JPizza).

Referring now to FIG. 3, illustrated is an example schematic system block diagram of a mobile device communicating with a carrier-based wireless access point device. An internal file of the UE 102 can comprise Wi-Fi MACs statically associated with the geographic locale of the UE 102. Therefore, every MAC in the country need not be stored. However, those MACs that are within a geographic threshold (e.g., relatively near the mobile device "home") can be stored to save storage space. For example, a network Wi-Fi 302 can be stored as a home device based on its location in reference to the amount of time the UE 102 spends communicating with the network Wi-Fi 302.

The UE 102 has a couple of different options to decipher if the network Wi-Fi 302 is actually a home Wi-Fi device. The UE 102 can query the internal home Wi-Fi list 202 and/or the UE 102 can query the communication service provider network 106 via the network node 104. In response to the query, the UE 102 can receive Wi-Fi list data from a Wi-Fi list database 304, which can be based on binned Wi-Fi lists for the geographic location between the UE 102 and the network Wi-Fi 302. In response to the query, the UE 102 can also receive Wi-Fi display name data, representative of the Wi-Fi name to be displayed to reference the network Wi-Fi 302, from a Wi-Fi display name server 306. It should be noted that in other embodiments, the display name data can be received from the network Wi-Fi 302 and/or stored internally at the UE 102.

Figure 4:
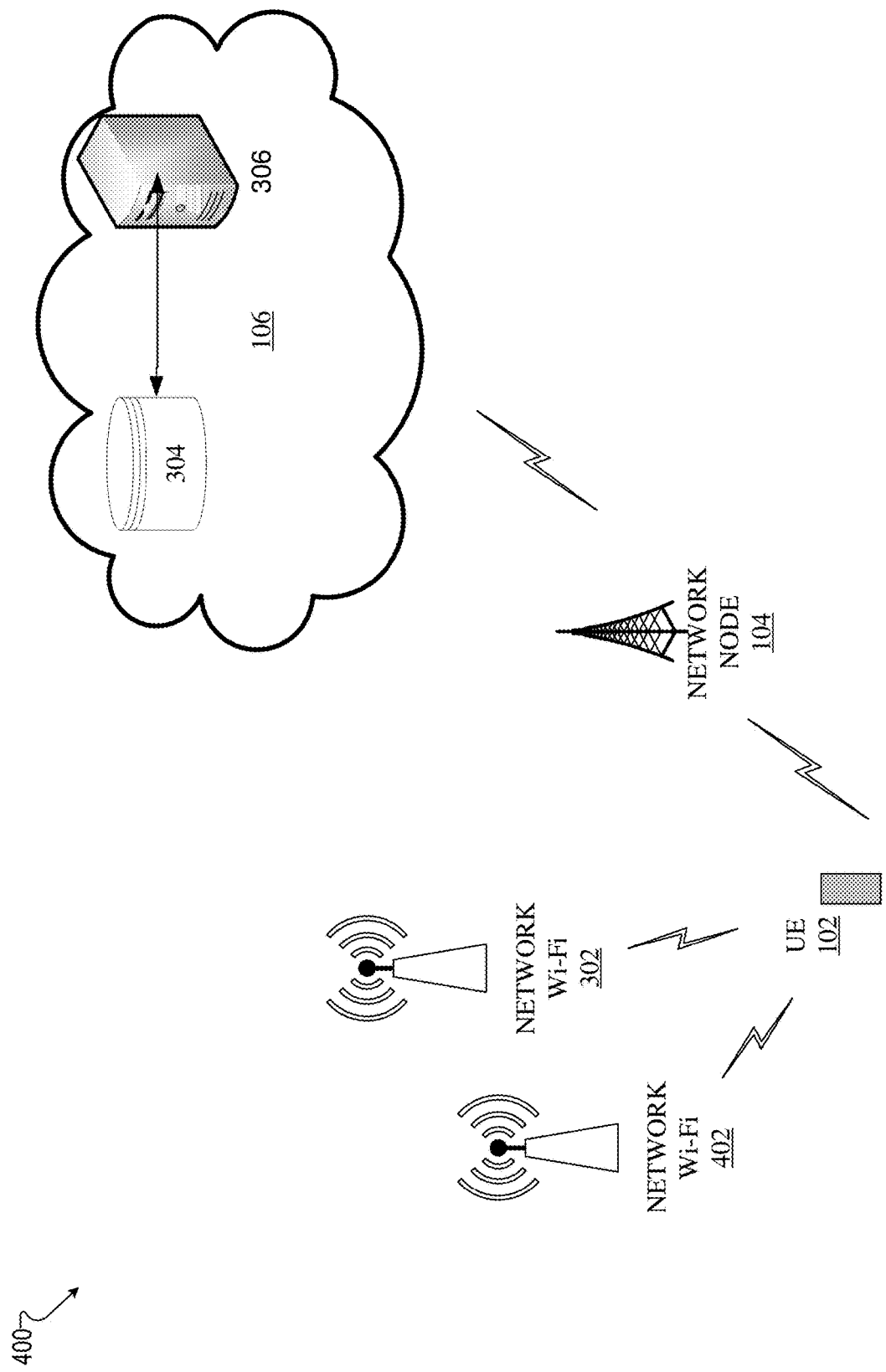
FIG. 4 illustrates an example schematic system block diagram of a mobile device communicating with a carrier-based wireless access point device and a federated wireless access point device.

Referring now to FIG. 4, illustrated is an example schematic system block diagram 400 of a mobile device communicating with a carrier-based wireless access point device and a federated wireless access point device. It should be noted that repetitive description of like elements is omitted for the sake of brevity.

In another embodiment, as depicted in FIG. 4, the UE 102 can begin communication with another Wi-Fi device 402 based on its geographic location. The network Wi-Fi 402 can be a federated wireless access point, which means that although this access point may not be from the service provider of the UE 102, the access point is an extension of the service provider network based on a contractual obligation. Thus, the UE 102 should display the service provider information when communicating with the network Wi-Fi 402. To determine what data should be displayed, the UE 102 can query the internal home Wi-Fi list 202 and/or it can query the communication service provider network 106 for information about the network Wi-Fi 402. Because the network Wi-Fi 402 is a federated wireless access point, the display control function 204 can facilitate displaying the name of the service provider instead of the name of the wireless access point (e.g., JPizza).

It should also be noted that the definition of home network device can change based on the amount of memory allocable to the task of storing the Wi-Fi MACs. Thus, if a user takes a vacation, perhaps the "home Wi-Fi set" is revised after a specific time period (e.g., 72 hours). Based on this scenario, if the UE 102 is in communication with the network Wi-Fi 402 for more than 72 hours, then the network Wi-Fi 402 can be revised and listed as a home network device in the internal home Wi-Fi list 202 of the UE 102. This process can also remove the network Wi-Fi 302 from the internal home Wi-Fi list 202 to save memory capacity on the mobile device. Because the network Wi-Fi 402 is now listed as a home network device in the internal home Wi-Fi list 202, this can also prevent the UE 102 from having to query the communication service provider network 106 every time the UE 102 is in communication with the network Wi-Fi 402. This can be managed by configuration parameters on the UE 102 based on the device type. Furthermore, the amount of memory allocated to the task of retaining the "home Wi-Fi set" can be fungible and can be reduced to a minimum or even zero if memory needs dictate it.

Figure 5:
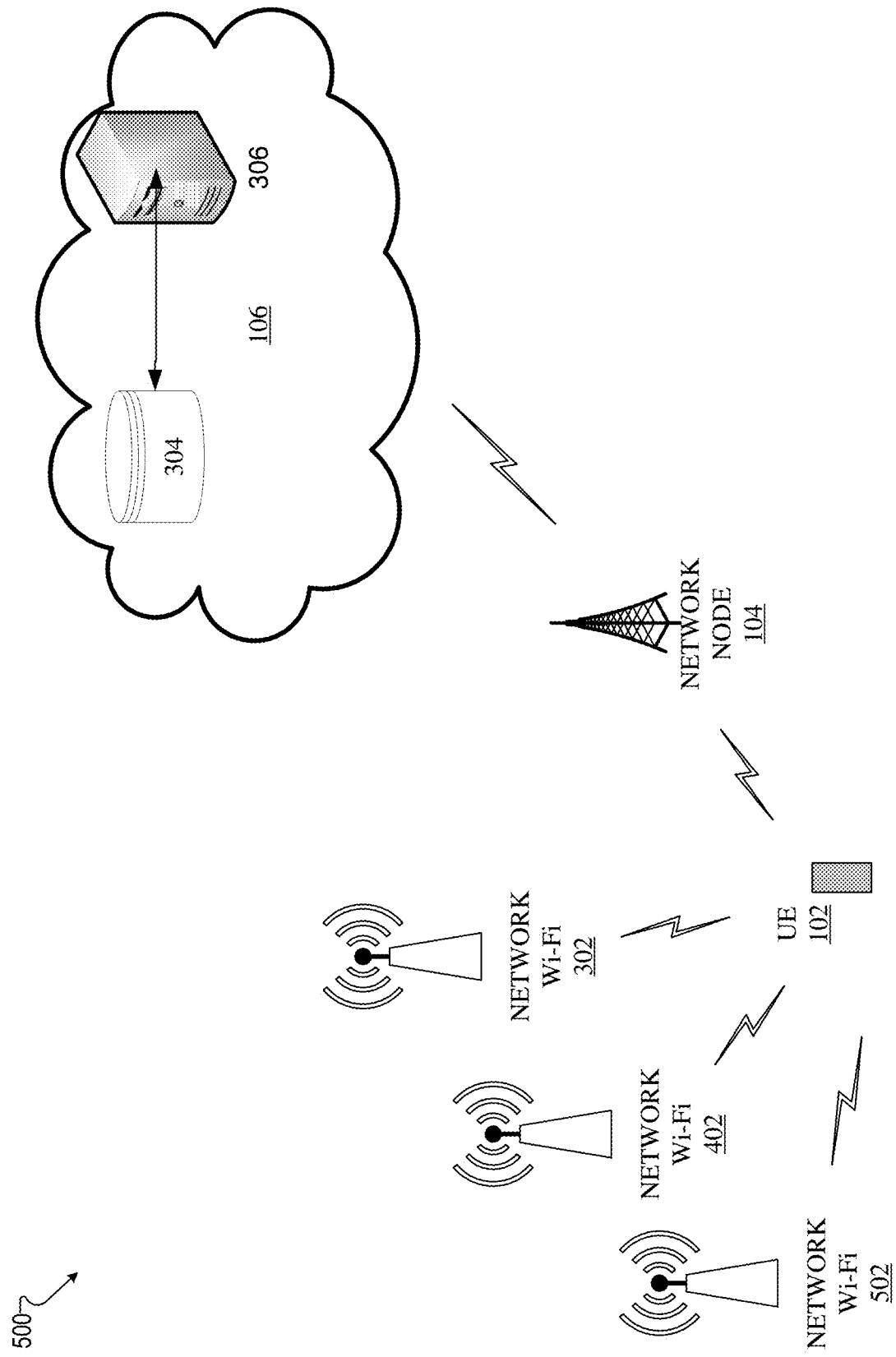
FIG. 5 illustrates an example schematic system block diagram of a mobile device communicating with a carrier-based wireless access point device, a federated wireless access point device, and non-carrier non-federated wireless access point device.

Referring now to FIG. 5, illustrated is an example schematic system block diagram of a mobile device communicating with a carrier-based wireless access point device, a federated wireless access point device, and non-carrier non-federated wireless access point device. It should be noted that repetitive description of like elements is omitted for the sake of brevity.

In another embodiment, as depicted in FIG. 5, the UE 102 can begin communication with another Wi-Fi device 502 based on its geographic location. The network Wi-Fi 502 can be a non-carrier, non-federated (e.g., non-contracted) wireless access point, which means that although this access point is not associated with a service provider of the UE 102, and there it is not an extension of the service provider network based on a contractual obligation. Thus, the UE 102 can display the basic SSID (e.g., JPizza). To determine what data should displayed, the UE 102 can query the internal home Wi-Fi list 202 and/or it can query the communication service provider network 106 for information about the network Wi-Fi 502. As opposed to the embodiments of FIGS. 3 and 4 where the network Wi-Fi 302, 402 is from the service provider or an extension of the service provider (e.g., via a contractual relationship) and the name of the network Wi-Fi 302, 402 can be found in the home Wi-Fi list and/or the Wi-Fi list database 304, the network Wi-Fi 502 is neither is a non-carrier and non-federated wireless access point. Thus, the name of the network Wi-Fi 502 cannot be found in the home Wi-Fi list and/or the Wi-Fi list database 304. In alternative embodiments, the name of the network Wi-Fi 502 can be found in the home Wi-Fi list and/or the Wi-Fi list database 304, however, there can be an indication that the network Wi-Fi 502 is a non-carrier and non-federated wireless access point. Consequently, the UE 102 can display the basic SSID (e.g., JPizza) to indicate to a user that the network Wi-Fi is not associated with the UE 102 carrier.

Figure 6:
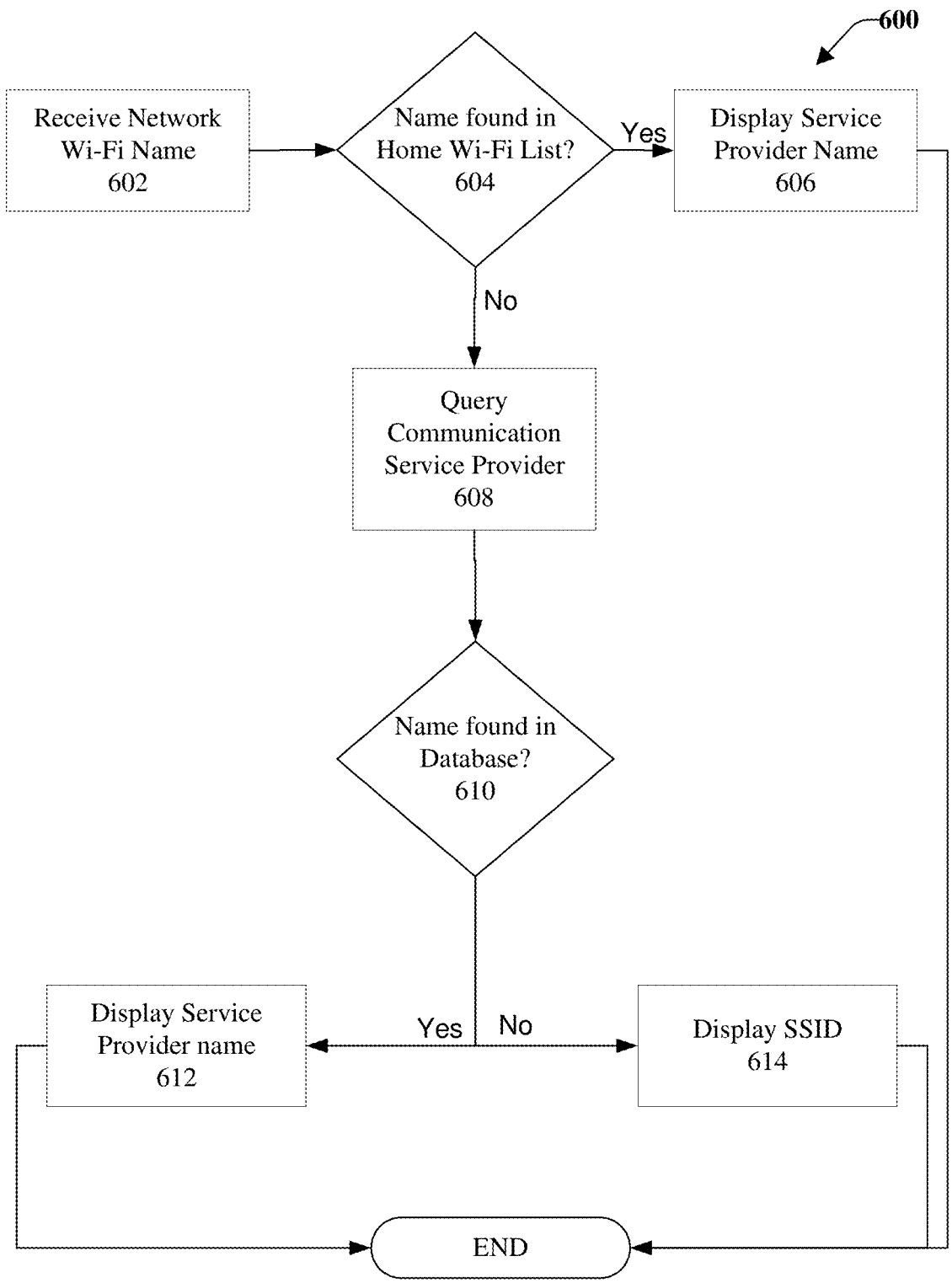
FIG. 6 illustrates an example an example flow diagram for a display associated with a federated wireless access point device.

Referring now to FIG. 6, illustrated is an example flow diagram 600 for a display associated with a federated wireless access point device. It should be noted that repetitive description of like elements is omitted for the sake of brevity.

At block 602 the UE 102 can receive data associated with a network Wi-Fi name 302, 402, 502. At block 604, the UE 102 can compare the network Wi-Fi name 302, 402, 502 to the home Wi-Fi list 202 found on the UE 102. If the network Wi-Fi name 302, 402, 502 is found on the home Wi-Fi list 202, then the UE 102 can display the service provider name at block 606. However, if the network Wi-Fi name 302, 402, 502 is not found on the home Wi-Fi list 202, then the UE 102 can query the communication network service provider 106, at block 608, to determine if the network Wi-Fi 302, 402, 502 name is found in the Wi-Fi list database 304. If the network Wi-Fi name 302, 402, 502 is found within the Wi-Fi list database 304, then the communication network service provider 106 can send the UE 102 a signal indicating such so that the service provider name is displayed on the UE 102 at block 612. However, if the network Wi-Fi name 302, 402, 502 is not found within the Wi-Fi list database 304, then the communication network service provider 106 can send the UE 102 a signal indicating such so that the SSID of the network Wi-Fi name 302, 402, 502 is displayed on the UE 102 at block 614.

Figure 7:
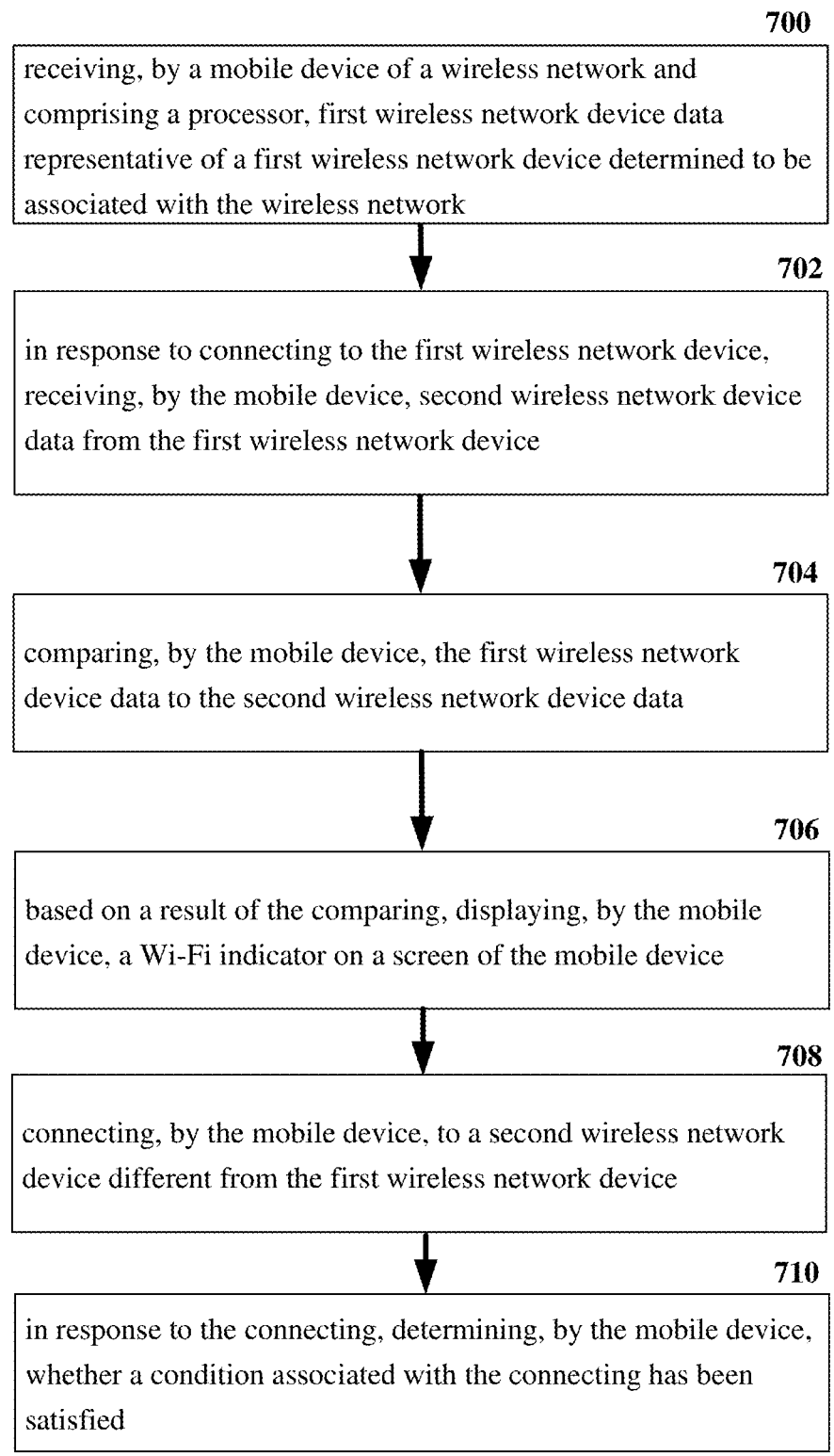
FIG. 7 illustrates an example flow diagram for a method associated with a display representative of federated wireless access points.

Referring now to FIG. 7, is an example flow diagram for a method associated with a display representative of federated wireless access points. At element 700, a method can comprise receiving (via the UE 102) first wireless network device data representative of a first wireless network device (from the network node 104) determined to be associated with the wireless network. In response to connecting to the first wireless network device (e.g., network Wi-Fi 302), the method can comprise receiving (via UE 102) second wireless network device data from the first wireless network device (e.g., the network node 104) at element 702. The method can also comprise comparing (via the UE 102) the first wireless network device data to the second wireless network device data at element 704. Based on a result of the comparing, the method can comprise displaying a Wi-Fi indicator on a screen of the mobile device (e.g., the UE 102) at element 706. The method can also comprise connecting to a second wireless network device (e.g., network Wi-Fi name 402) different from the first wireless network device (e.g., network Wi-Fi name 302) at element 708, and in response to the connecting, the method can comprise determining whether a condition associated with the connecting has been satisfied at element 710.

Figure 8:
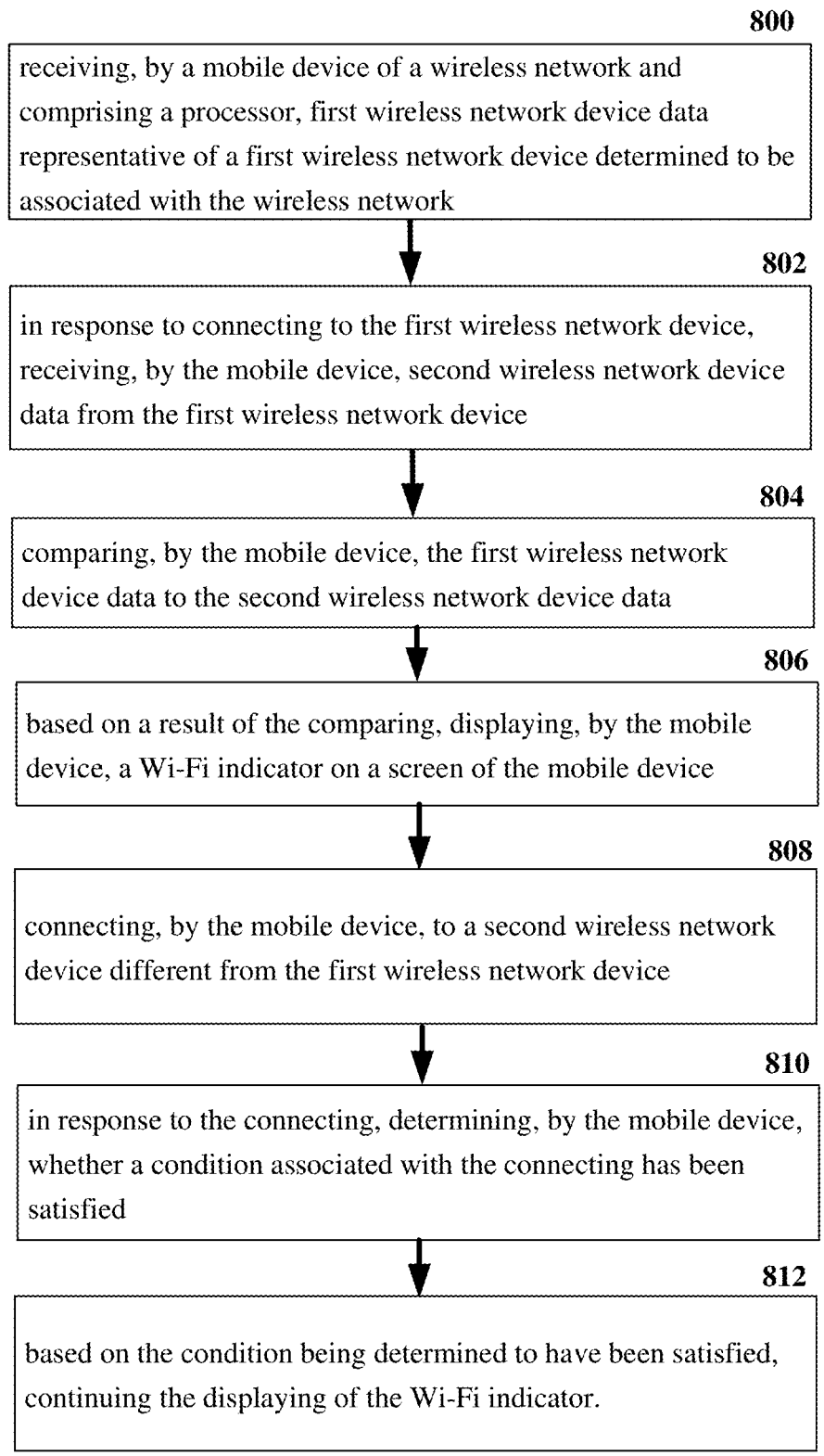
FIG. 8 illustrates an example flow diagram for a method associated with a display representative of federated wireless access points.

Referring now to FIG. 8, is an example flow diagram for a method associated with a display representative of federated wireless access points. At element 800, a method can comprise receiving (via the UE 102) first wireless network device data representative of a first wireless network device (from the network node 104) determined to be associated with the wireless network. In response to connecting to the first wireless network device (e.g., network Wi-Fi name 302), the method can comprise receiving (via UE 102) second wireless network device data from the first wireless network device (e.g., the network node 104) at element 802. The method can also comprise comparing (via the UE 102) the first wireless network device data to the second wireless network device data at element 804. Based on a result of the comparing, the method can comprise displaying a Wi-Fi indicator on a screen of the mobile device (e.g., the UE 102) at element 806. The method can also comprise connecting to a second wireless network device (e.g., network Wi-Fi name 402) different from the first wireless network device (e.g., network Wi-Fi 302) at element 808, and in response to the connecting, the method can comprise determining whether a condition associated with the connecting has been satisfied at element 810. At element 812, based on the condition being determined to have been satisfied, continuing the displaying of the Wi-Fi indicator.

Figure 9:
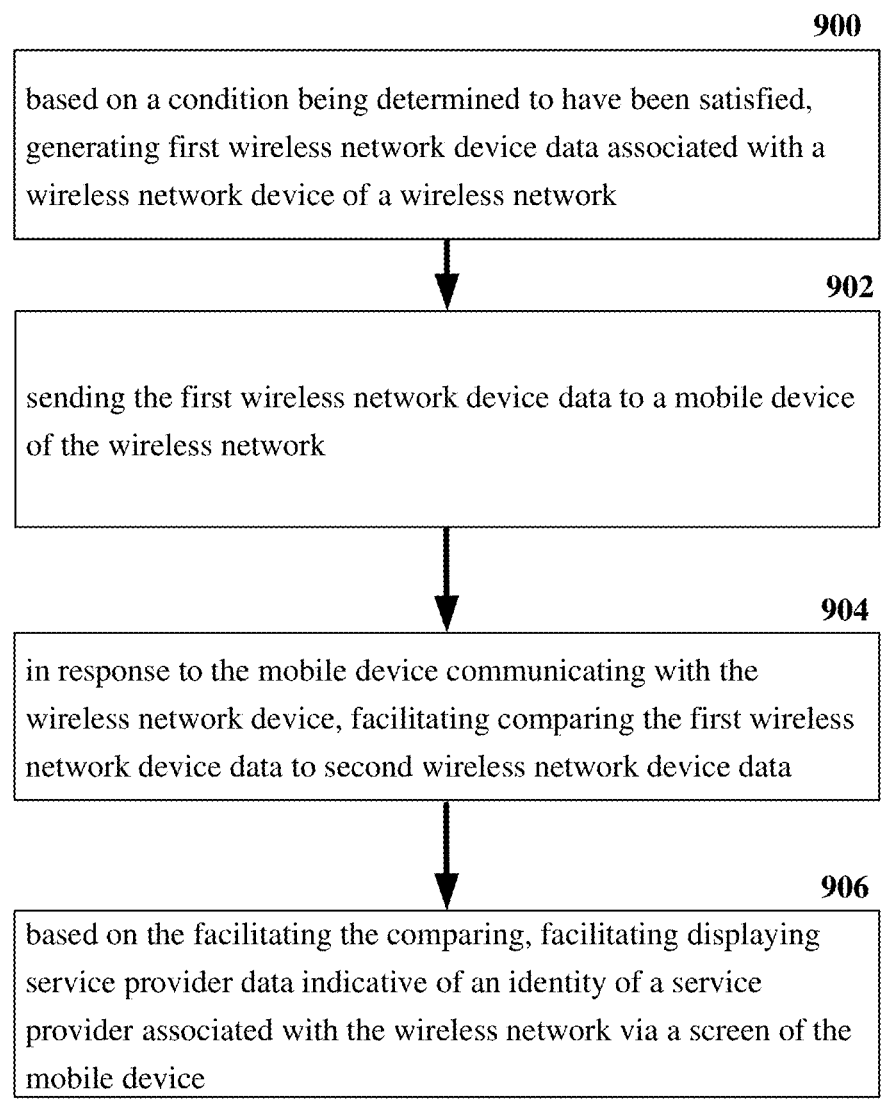
FIG. 9 illustrates an example flow diagram for a system associated with a display representative of federated wireless access points.

Referring now to FIG. 9, is an example flow diagram for a system associated with a display representative of federated wireless access points. According to another embodiment, at element 900 a system can facilitate, generating first wireless network device data associated with a wireless network device (e.g., network Wi-Fi name 302, 402, 502) of a wireless network based on a condition being determined to have been satisfied. At element 902, the system can facilitate sending the first wireless network device data to a mobile device (e.g., UE 102) of the wireless network. In response to the mobile device (e.g., UE 102) communicating with the wireless network device (e.g., network Wi-Fi name 302, 402, 502), the system can facilitate comparing the first wireless network device data to second wireless network device data at element 904. Furthermore, based on the facilitating the comparing, the system can facilitate displaying service provider data indicative of an identity of a service provider associated with the wireless network via a screen of the mobile device (e.g., the UE 102) at element 906.

Figure 10:
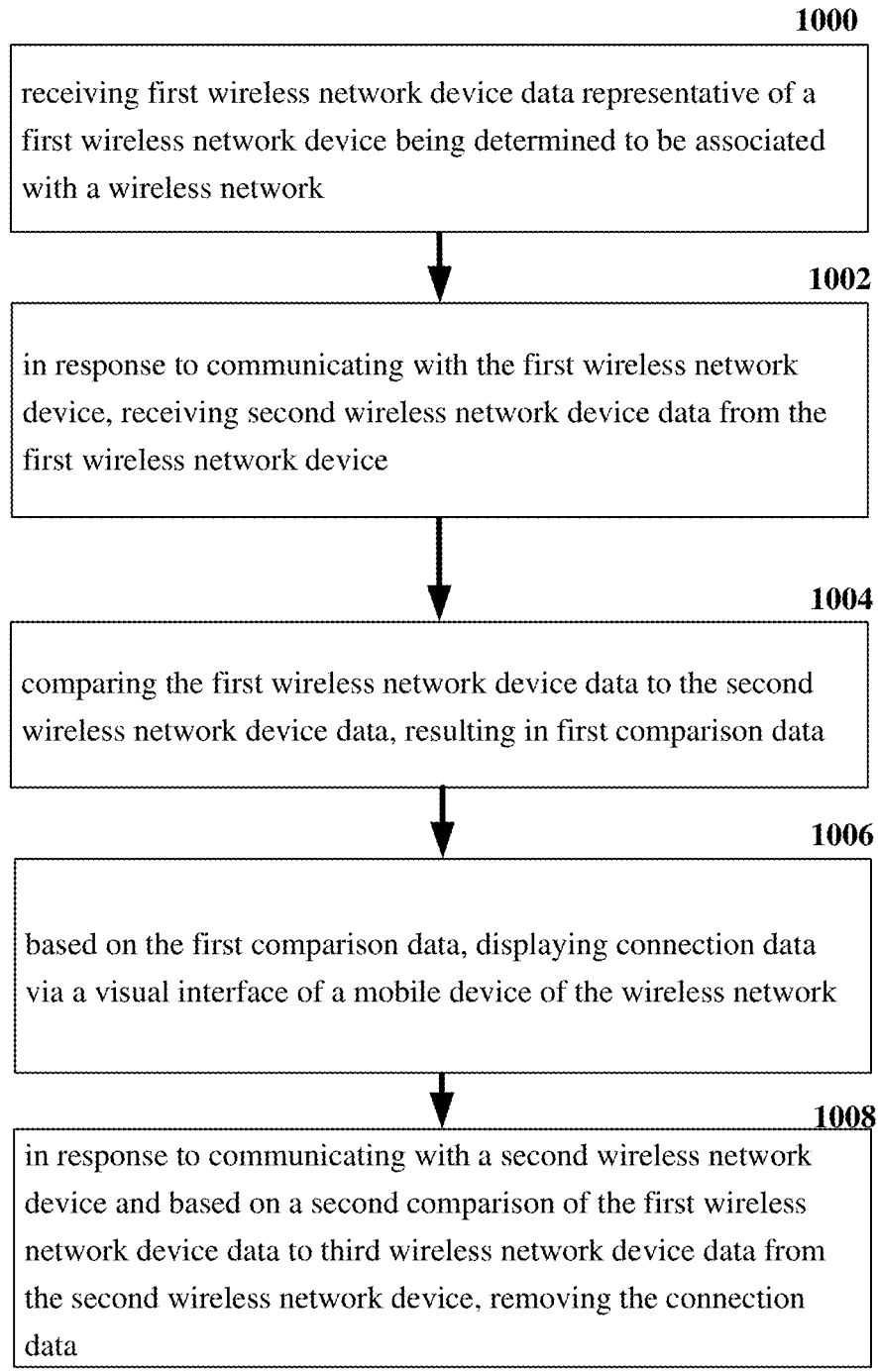
FIG. 10 illustrates an example flow diagram for a machine-readable medium associated with a display representative of federated wireless access points.

Referring now to FIG. 10, is an example flow diagram for a machine-readable medium associated with a display representative of federated wireless access points. At element 1000, a machine-readable storage medium that can perform the operations comprising receiving first wireless network device data representative of a first wireless network device (e.g., network Wi-Fi 302) being determined to be associated with a wireless network. In response to communicating with the first wireless network device (e.g., network Wi-Fi name 302), the machine-readable storage medium can perform operations comprising receiving second wireless network device data from the first wireless network device (e.g., network Wi-Fi name 302) at element 1002. The machine-readable storage medium can perform operations comprising comparing the first wireless network device data to the second wireless network device data, resulting in first comparison data at element 1004. Based on the first comparison data, the machine-readable storage medium can perform operations comprising displaying connection data via a visual interface of a mobile device (e.g., the UE 102) of the wireless network at element 1006. Additionally, in response to communicating with a second wireless network device (e.g., network Wi-Fi name 502) and based on a second comparison of the first wireless network device data to third wireless network device data from the second wireless network device (e.g., network Wi-Fi name 502), the machine-readable storage medium can perform operations comprising removing the connection data at element 1008.

Figure 11:
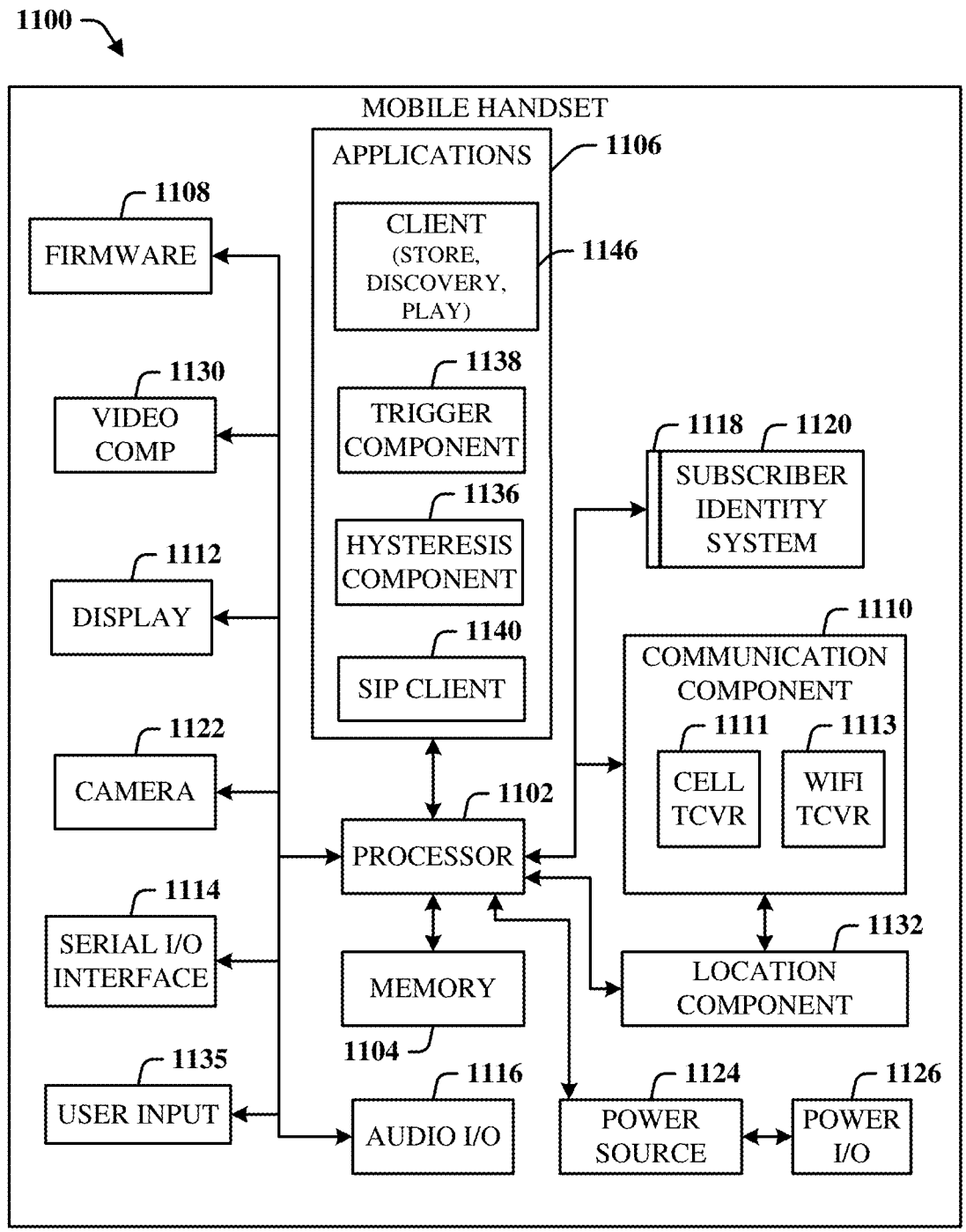
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
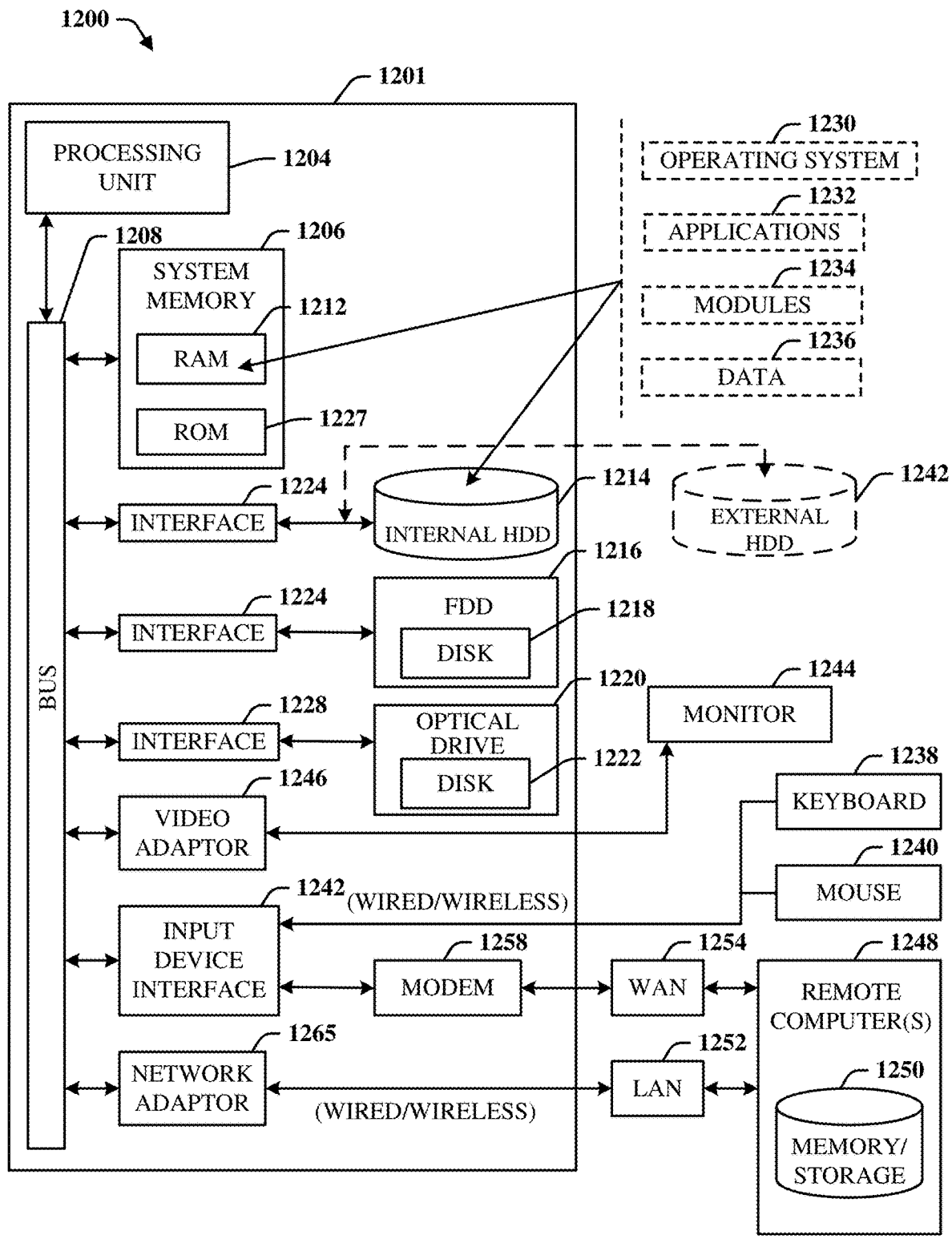
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party.

While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Wi-Fi offload of cellular networks is increasingly important as data demand continually pushes the needs for finite spectrum resources. However, switching dynamically between networks and carriers in a seamless manner can influence the expectation from a mobile customer about being "on" their carrier's network. If they see on their mobile device that they are connected to XYZ Mobile, which is not their carrier, it can raise concerns. Thus, a system is needed that can modify a UE display to also identify federated Wi-Fi devices as being an extension of a wireless carrier service provider.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   in response to a defined time duration being determined to have lapsed, initiating, by a user equipment comprising a processor, sending request data, representative of a request, to a base station via a network;
   in response to sending the request data, receiving, by the user equipment, first Wi-Fi device data representative of a first Wi-Fi device determined to be associated with the network;
   in response to connecting to the first Wi-Fi device, receiving, by the user equipment, second Wi-Fi device data from the first Wi-Fi device;
   comparing, by the user equipment, the first Wi-Fi device data to the second Wi-Fi device data;
   based on a result of the comparing, displaying, by the user equipment, a Wi-Fi indicator on a screen of the user equipment;
   connecting, by the user equipment, to a second Wi-Fi device different from the first Wi-Fi device; and
   in response to the connecting, determining, by the user equipment, whether a condition associated with the connecting has been satisfied.

2. The method of claim 1, further comprising:
   based on the condition being determined to have been satisfied, continuing the displaying of the Wi-Fi indicator.

3. The method of claim 2, wherein the Wi-Fi indicator comprises an indication that the second Wi-Fi device is associated with a service provider enabling the network.

4. The method of claim 1, wherein the first Wi-Fi device data is stored in a memory of the user equipment, and wherein the second Wi-Fi device data comprises basic service set identifier data associated with an identity of the second Wi-Fi device.

5. The method of claim 1, further comprising:
   based on the condition being determined not to have been satisfied, ceasing, by the user equipment, the displaying of the Wi-Fi indicator.

6. The method of claim 1, wherein the first Wi-Fi device data is stored in a memory of the user equipment as a function of time, and wherein the first Wi-Fi device data is stored in the memory based on a geographic location of the first Wi-Fi device.

7. The method of claim 6, wherein the geographic location is a first geographic location, and wherein the first Wi-Fi device data is stored in the memory based on the first geographic location of the first Wi-Fi device in relation to a second geographic location of the base station associated with the network.

8. A system, comprising:
   a processor; and
   a memory that stores executable instructions that, when executed by the processor, facilitate performance of operations, comprising:
     in response to a defined time duration being determined to have been lapsed upon a power-up procedure of a user equipment, receiving request data, representative of a request for first Wi-Fi device data from the user equipment;
     in response to receiving the request data, and based on a condition being determined to have been satisfied, generating the first Wi-Fi device data associated with a Wi-Fi device communicatively coupled to a network;
     sending the first Wi-Fi device data to the user equipment via the network;
     in response to the user equipment communicating with the Wi-Fi device, facilitating comparing the first Wi-Fi device data to second Wi-Fi device data; and
     based on the facilitating of the comparing, facilitating displaying service provider data indicative of an identity of a service provider associated with the network via a screen of the user equipment.

9. The system of claim 8, wherein the condition is a function of a relationship between the Wi-Fi device and the service provider.

10. The system of claim 8, wherein the identity of the service provider is a first identity, and wherein the second Wi-Fi device data comprises identity data representative of a second identity of the Wi-Fi device.

11. The system of claim 8, wherein the operations further comprise:
    in response to the sending the first Wi-Fi device data to the user equipment of the network, facilitating storing the first network data at the user equipment.

12. The system of claim 11, wherein the operations further comprise:
    in response to a time associated with the communicating having been determined to have lapsed, deleting the first Wi-Fi data from the user equipment.

13. The system of claim 8, wherein the operations further comprise:
    in response to the sending of the first Wi-Fi device data to the user equipment, facilitating storing the first Wi-Fi data at a data store, wherein the data store is remote for the user equipment.

14. The system of claim 8, wherein the operations further comprise:
    based on the comparing of the first Wi-Fi device data to the second Wi-Fi device data, determining a service associated with the network.

15. A non-transitory machine-readable medium, comprising executable instructions that, when executed by a processor, facilitate performance of operations, comprising:
    in response to a defined time duration being determined to have been lapsed, sending request data, representative of a request for first Wi-Fi device data representative of a first Wi-Fi to network equipment;
    in response to sending the request data, receiving the first Wi-Fi device data representative of the first Wi-Fi device being determined to be associated with a network;
    in response to communicating with the first Wi-Fi device, receiving second Wi-Fi device data from the first Wi-Fi device;
    comparing the first Wi-Fi device data to the second Wi-Fi device data, resulting in first comparison data;
    based on the first comparison data, displaying connection data via a visual interface of a user equipment of the network, resulting in displayed connection data; and
    in response to communicating with a second Wi-Fi device and based on a second comparison of the first Wi-Fi device data to third Wi-Fi device data from the second Wi-Fi device, removing the displayed connection data.

16. The non-transitory machine-readable medium of claim 15, wherein the operations further comprise:
    downloading a data structure representative of Wi-Fi devices associated with the network.

17. The non-transitory machine-readable medium of claim 16, wherein the operations further comprise:
    based on a time period associated with the communicating being determined to have expired, modifying the data structure.

18. The non-transitory machine-readable medium of claim 17, wherein the modifying of the data structure comprises removing the first Wi-Fi device data from the data structure.

19. The non-transitory machine-readable medium of claim 15, wherein the operations further comprise:
    based on a location associated with the first Wi-Fi device, labeling the first Wi-Fi device as a home Wi-Fi device.

20. The non-transitory machine-readable medium of claim 19, wherein the operations further comprise:
    in response to the labeling of the first Wi-Fi device as the home Wi-Fi device, displaying service provider identity data via the visual interface of the user equipment.

\* \* \* \* \*